United States Patent
Damodaran et al.

(10) Patent No.: US 11,522,903 B2
(45) Date of Patent: *Dec. 6, 2022

(54) METHODS AND SYSTEMS FOR EVALUATING EFFECTS OF CYBER ATTACKS ON CYBER-PHYSICAL SYSTEMS

(71) Applicant: The MITRE Corporation, McLean, VA (US)

(72) Inventors: Suresh K. Damodaran, Acton, MA (US); Saurabh Mittal, Herndon, VA (US)

(73) Assignee: The MITRE Corporation, McLean, VA (US)

( * ) Notice: Subject to any disclaimer, the term of this patent is extended or adjusted under 35 U.S.C. 154(b) by 168 days.

This patent is subject to a terminal disclaimer.

(21) Appl. No.: 17/067,244

(22) Filed: Oct. 9, 2020

(65) Prior Publication Data

US 2021/0029155 A1  Jan. 28, 2021

Related U.S. Application Data

(63) Continuation of application No. 15/958,750, filed on Apr. 20, 2018, now Pat. No. 10,862,919.

(Continued)

(51) Int. Cl.
*H04L 9/40* (2022.01)
*G06F 21/53* (2013.01)
(Continued)

(52) U.S. Cl.
CPC .......... *H04L 63/1433* (2013.01); *G06F 21/53* (2013.01); *G06F 21/566* (2013.01);
(Continued)

(58) Field of Classification Search
CPC ... H04L 63/1433; H04L 41/145; G06F 21/53; G06F 21/566; G06F 21/577; G06F 2221/034
See application file for complete search history.

(56) References Cited

U.S. PATENT DOCUMENTS 8,601,587 B1 12/2013 Powell et al.
2011/0185432 A1 7/2011 Sandoval et al.
(Continued)

OTHER PUBLICATIONS

Damodaran et al., U.S. Office Action dated May 4, 2020 directed to U.S. Appl. No. 15/958,750; 13 pages.

*Primary Examiner* — Meng Li
(74) *Attorney, Agent, or Firm* — Morrison & Foerster LLP (57) ABSTRACT

Described are systems and methods for evaluating cyber effects in a cyber-physical system (CPS). In some embodiments, a simulation model of the CPS is built and includes an attacked component set and an evaluated component set. A control component is inserted into the simulation model. One or more direct connections between the attacked component set and the evaluated component set are disconnected. One or more indirect connections are identified and then disconnected from the simulation model with disconnected direct connections. The one or more direct connections and indirect connections are routed through the control component. A cyber-attack on the attacked component set can be simulated by configuring the control component to control outputs transmitted via a routed connection, the routed connection being one of the routed direct or indirect connections. The simulated components of the simulation model can be progressively and iteratively replaced by corresponding components from the CPS.

29 Claims, 6 Drawing Sheets

Related U.S. Application Data

(60) Provisional application No. 62/489,184, filed on Apr. 24, 2017, provisional application No. 62/488,632, filed on Apr. 21, 2017.

(51) Int. Cl.
*H04L 41/14* (2022.01)
*G06F 21/57* (2013.01)
*G06F 21/56* (2013.01)

(52) U.S. Cl.
CPC .......... *G06F 21/577* (2013.01); *H04L 41/145* (2013.01); *G06F 2221/034* (2013.01)

(56) References Cited

U.S. PATENT DOCUMENTS

| | | | |
|---|---|---|---|
| 2011/0283110 A1* | 11/2011 | Dapkus | H04L 9/3234 |
| | | | 713/182 |
| 2013/0198840 A1 | 8/2013 | Drissi et al. | |
| 2013/0198847 A1* | 8/2013 | Sampigethaya | H04L 63/1433 |
| | | | 726/25 |
| 2014/0172401 A1* | 6/2014 | Hwang | G06F 8/34 |
| | | | 703/18 |
| 2015/0106941 A1 | 4/2015 | Muller et al. | |
| 2015/0149812 A1* | 5/2015 | Arisoylu | G06F 11/0793 |
| | | | 714/4.1 |
| 2016/0147244 A1 | 5/2016 | Momoh | |
| 2016/0285907 A1* | 9/2016 | Nguyen | H04L 63/1433 |
| 2018/0082058 A1* | 3/2018 | Ferragut | G06F 21/552 |
| 2018/0225466 A1 | 8/2018 | Ducatel et al. | |
| 2019/0073666 A1 | 3/2019 | Ortiz et al. | |
| 2019/0278692 A1* | 9/2019 | Jebbar | G06F 8/65 |

* cited by examiner

METHODS AND SYSTEMS FOR EVALUATING EFFECTS OF CYBER ATTACKS ON CYBER-PHYSICAL SYSTEMS

CROSS-REFERENCE TO RELATED APPLICATIONS

This application is a continuation of Ser. No. 15/958,750, filed Apr. 20, 2018 which claims the benefit of U.S. Provisional Application No. 62/488,632, filed Apr. 21, 2017, and U.S. Provisional Application No. 62/489,184, filed Apr. 24, 2017, the entire contents of each of which are incorporated herein by reference.

FIELD OF THE DISCLOSURE

The present disclosure relates to evaluating effects of cyber-attacks on cyber-physical systems. More specifically, the present disclosure relates to systems and methods for building a simulation model for the cyber-physical system and inserting a control component in the simulation model to evaluate effects of cyber-attacks.

BACKGROUND OF THE DISCLOSURE

A cyber-physical system (CPS) is a system having interacting networks of physical components and software components. While a legacy CPS may be built as an isolated system with limited or no network connectivity, a modern CPS is often built with network connectivity, e.g., connection to the Internet. A CPS can range from Industrial Control Systems (ICS) to Internet of Things (IoT) systems and encompass a wide variety of protocols, buses, and networks. For example, a CPS may include modern automobiles, airplanes, ships, medical devices, power plants, scientific instruments, etc.

By connecting the CPS to a network such as the Internet, the software components within the CPS become exposed to cyber-attacks in which a hacker or otherwise unauthorized user can manipulate the CPS in undesired ways. Additionally, the hacker may attack the physical system directly, and use such access to attack software components. Cyber-attacks on the CPS may be particularly devastating because such attacks may affect the operations of physical components in the CPS. For example, whereas malware running a laptop may only obstruct a user from operating the laptop as desired, malware running on a processor in a CPS, such as an automobile, may adversely affect physical components such as the brakes or the steering wheel and endanger the lives of passengers.

Therefore, rigorous cyber risk assessment needs to be performed on CPS to assess how cyber-attacks may affect the behavior of the CPS. Cyber risk assessment is the process of identifying, estimating, and prioritizing risks resulting from the operation of a system. This process incorporates threat and vulnerability analyses, and considers mitigations provided by security controls to-be-implemented or in place in the system. Use of a framework for analyzing cyber-attacks against CPS could help in systematic analysis of risk. However, assessing the impact of cyber-attacks by directly testing and attacking the CPS is often undesirable. Because a modern CPS is a complex system, there is a risk of malware contamination where not all of the malware that was introduced in the CPS during testing is properly removed after testing of the CPS is completed. This may cause the CPS to malfunction during later operation or to stop working after testing. Additionally, during testing where the CPS is purposely exposed to cyber-attacks, the physical components within the CPS may become damaged. Therefore, the physical components, which are often expensive, may need to be repaired or replaced after testing the CPS.

SUMMARY OF THE DISCLOSURE

Described are systems and methods for evaluating cyber effects in a cyber physical system (CPS). In some embodiments, a simulation model of the CPS is built and includes an attacked component set and an evaluated component set. The attacked component set includes at least one component in the simulation model. The evaluated component set includes at least one component in the simulation model. A control component is inserted into the simulation model. One or more direct connections between the attacked component set and the evaluated component set are disconnected. One or more indirect connections are determined from the simulation model without the one or more direct connections and disconnected from the simulation model. The one or more direct connections and the one or more indirect connections are routed through the control component. A cyber-attack on the attacked component set can be simulated by configuring the control component to control an output transmitted via a routed connection, the routed connection being one of the routed direct or indirect connections. The model components may be iteratively replaced by CPS components, including software or physical components, to improve the cyber-attack and evaluation fidelity.

BRIEF DESCRIPTION OF THE DRAWINGS

The foregoing summary, as well as the following detailed description of embodiments, is better understood when read in conjunction with the appended drawings. For the purpose of illustrating the present disclosure, the drawings show example embodiments of the disclosure; the disclosure, however, is not limited to the specific methods and instrumentalities disclosed. In the drawings.

DETAILED DESCRIPTION OF THE DISCLOSURE

As described above, a cyber-physical system (CPS) is a system having interacting networks of physical components and software components. In some embodiments, physical components include embedded software and may be capable of being controlled and monitored remotely by computer-based processes. To understand the cyber vulnerabilities of a CPS, it can be helpful to evaluate the different effects that cyber-attacks may have on the CPS. To evaluate the cyber effects, a simulation model of the CPS can be built to represent the physical and software components within the CPS. Examples of CPS may include modern vehicles, autonomous vehicles, sensor-aware elevator systems, smart grids, distributed robotics, automatic pilot avionics, medical equipment, manufacturing supply chain machinery, etc.

In some embodiments, the simulation model can be built as a plurality of coupled components to emulate both the structural and behavioral characteristics of the CPS. For example, Discrete EVent System (DEVS) models may be used to build the simulation model. An atomic component (e.g., an atomic DEVS model) may represent a component whose system architecture or behavior cannot be decomposed any further or whose decomposition would provide no useful information for assessing effects of cyber-attacks, according to some embodiments. In contrast, a coupled component (e.g., a coupled DEVS model) may represent two or more interacting components where each interacting component can be represented as either an atomic component or a coupled component. In some embodiments, the simulation model can be built as a System-of-Systems, where system components are within enclosing components. The enclosing components are analogous to the coupled components in DEVS, and a component that has no components within it is analogous to an atomic component. As used in the present disclosure herein, the terms "coupled component" and "atomic component" are used interchangeably with the phrases "enclosing component" and "basic component," respectively.

Building the simulation model of CPS can be advantageous because using simulation models allows for analysis of effects of precise cyber-attacks targeted towards a portion of the CPS, e.g., an attacked component set, and to study the effects of those cyber-attacks on a selected portion of the CPS, e.g., an evaluated component set. As described above, however, introducing cyber-attacks directly to the attacked component set may lead to malware contamination or irrevocably damage the evaluated component set.

In some embodiments, modeling the CPS as a simulation model with a plurality of coupled, simulated components and augmenting the simulation model with a configurable control component allows for greater flexibility in testing and evaluating the CPS while reducing the adverse effects discussed above. For example, to prevent damage or malware contamination of components within an existing CPS, one or more physical components within the existing CPS may be replaced with corresponding simulated components (e.g., an atomic component or a coupled component) before simulating cyber-attacks on a portion of the existing CPS via the control component. In another example, a simulation model may be built to represent a contemplated design of a new CPS. After evaluating the cyber effects and cyber risks of the simulation model, one or more of the simulated components in the simulation model can be replaced with corresponding physical or software components to build the new CPS. Iteratively cyber testing and evaluating the simulation model as more simulated components are progressively replaced with corresponding physical or software components reduces the cyber vulnerabilities of the new CPS when all of the simulated components in the simulation model have been replaced.

In some embodiments, the control component is inserted into the simulation model to intercept a portion of communications to and from the evaluated and attacked component sets. In particular, the control component may be configured to intercept all communications transmitted by the attacked and evaluated component sets that directly or indirectly affect the evaluated and attacked component sets, respectively. Further, in some embodiments, by configuring the control component to inject specific effects into the simulation model to simulate cyber-attacks on the attacked component set, the functionality of the attacked component set is not directly affected and therefore will not be adversely impacted. For example, the control component may be configured to alter information flowing through it or output new information to simulate how the attacked component set would operate when being cyber-attacked.

In the following description of the disclosure and embodiments, reference is made to the accompanying drawings in which are shown, by way of illustration, specific embodiments that can be practiced. It is to be understood that other embodiments and examples can be practiced, and changes can be made without departing from the scope of the disclosure.

In addition, it is also to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes", "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

All of these and similar terms, however, are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "displaying," or the like refer to the action and processes of a computer system, or similar electronic computing device, that manipulates and transforms data represented as physical (electronic) quantities within the computer system memories or registers or other such information storage, transmission, or display devices.

Certain aspects of the present disclosure include process steps and instructions described herein in the form of an algorithm. It should be noted that the process steps and instructions of the present disclosure could be embodied in software, firmware, or hardware, and when embodied in software, could be downloaded to reside on and be operated from different platforms used by a variety of operating systems.

Figure 1:
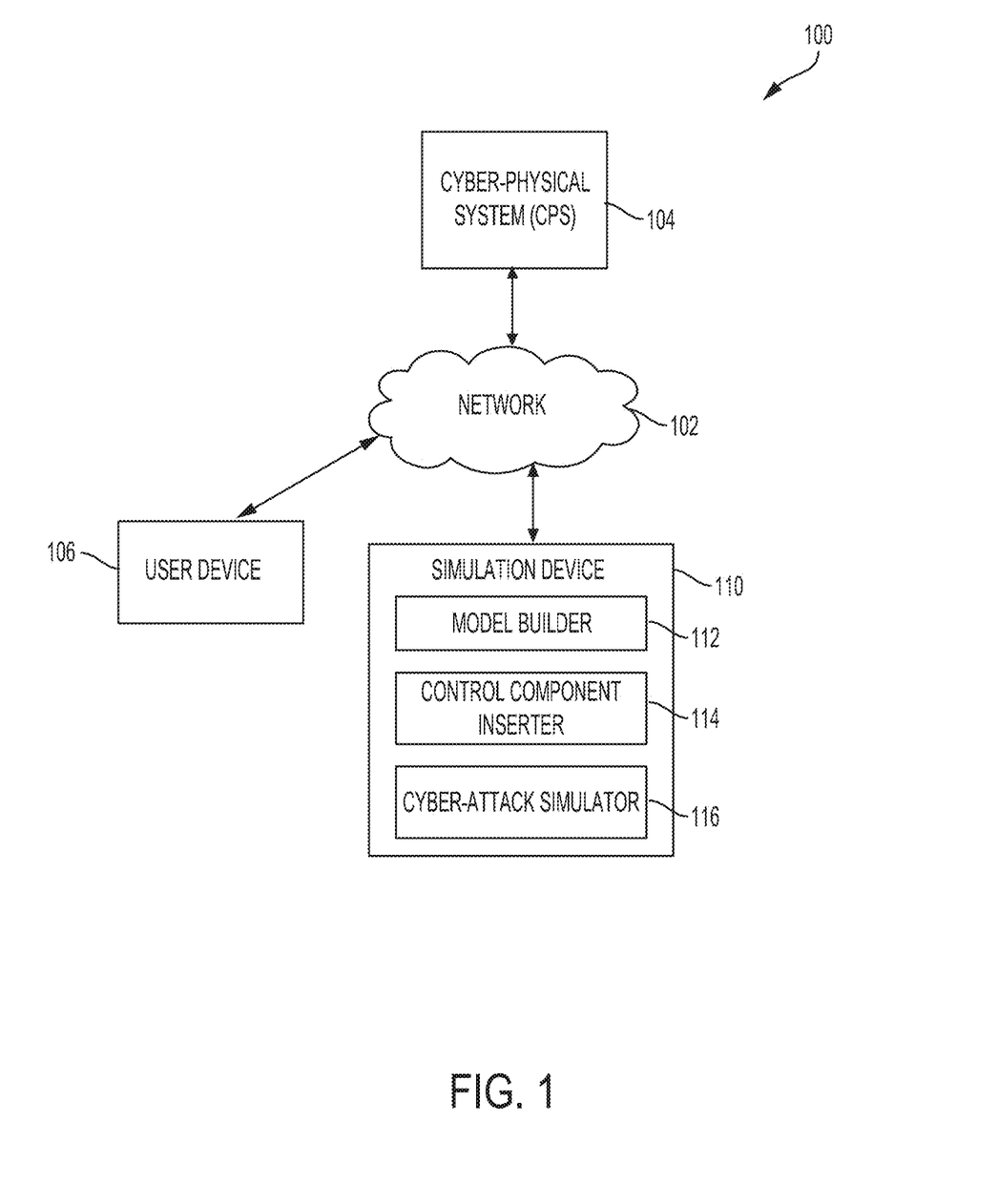
FIG. 1 illustrates a system for evaluating cyber effects in a cyber-physical system (CPS), according to some embodiments.

FIG. 1 is a block diagram illustrating a system 100 for evaluating cyber effects in a cyber-physical system (CPS), according to some embodiments. In some embodiments, system 100 includes a CPS 104, a user device 106, and a simulation device 110. As described above, CPS 104 is a system having interacting networks of physical and software components. As shown in system 100, CPS 104 has connectivity to network 102, which exposes the software components in CPS 104 to cyber-attacks. Network 102 can be a wired and/or wireless network that includes any combination of industrial automation protocols, buses, and networks such as Modbus, Profinet, Ethernet/IP, Zigbee, Z-Wave, DNP3, Controller Area Network (CAN), or enterprise TCP/IP based protocols and networks such as local area networks (LANs), wireless local area networks (WLANs), wide area networks (WANs), the Internet, and the like.

In some embodiments, a user may operate user device 106 to communicate with simulation device 110 to simulate and evaluate the effects of cyber-attacks on CPS 104. User device 106 may be any processor-based device capable of connecting to network 102 to communicate with simulation device 110. For example user device 106 may be a personal computer, a work station, a handheld device, or the like.

In some embodiments, simulation device 110 enables testing and evaluation of CPS 104 under cyber-attack by implementing the following components: model builder 112, control component inserter 114, and cyber-attack simulator 116. Each of these components may include a set of program instructions that when executed by one or more processors of simulation device 110 cause the one or more processors to perform the corresponding set of program instructions. In some embodiments, these components may be implemented on user device 106. Simulation device 110 may include one or more servers, one or more virtual machines, one or more cloud devices, or a combination thereof.

Figure 6:
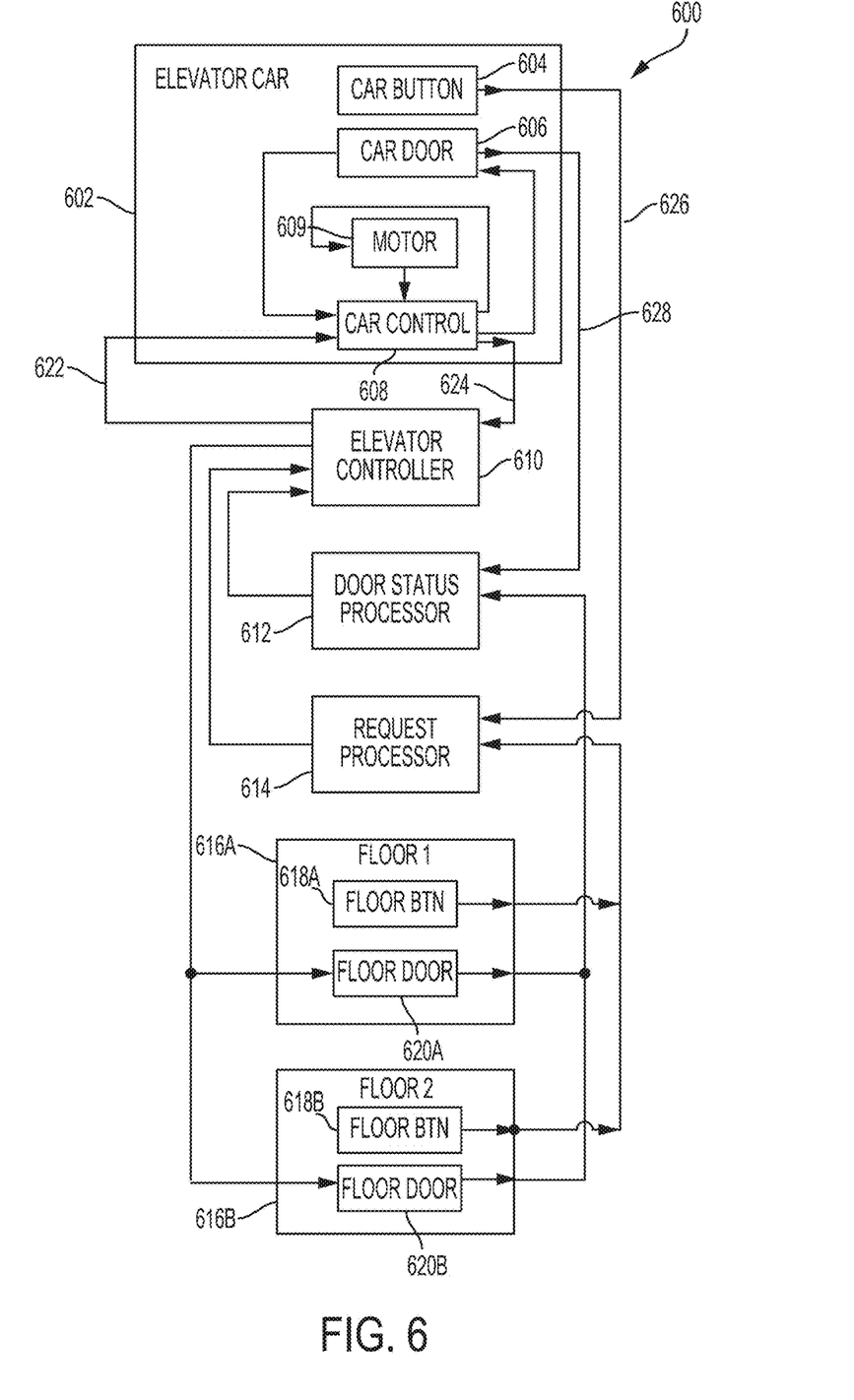
FIG. 6 illustrates a simulation model of an elevator system, according to some embodiments.

Model builder 112 builds a simulation model of CPS 104 including coupled components that emulate the structure and behavior of CPS 104. The simulation model includes one or more simulated components that correspond to one or more physical or software components in CPS 104. For ease of illustration, the following description of FIG. 1 may be described with respect to an elevator system, which is an example of CPS 104. FIG. 6 shows an example simulation model 600 of the elevator system built by model builder 112. Simulation model 600 includes the following simulated components: elevator car 602, car button 604, car door 606, car control 608, motor 609, elevator controller 610, door status processor 612, request processor 614, floor buttons 618A-B, floor doors 620A-B, and floors 616A-B. The following table lists the functionality of each of the components.

| Component Name | Function |
| --- | --- |
| Elevator Car 602 | This is the elevator car that moves between floors 616A-B |
| Car Button 604 | Button inside elevator car 602 that generates a floor request to request processor 614 |
| Car Door 606 | Car door position sensor that sends the position to door status processor |
| Car Control 608 | Controller that operates motor 609 and car door 606 under commands from elevator controller 610, and provides car position to elevator controller 610 |
| Motor 609 | A motor that activates the pulley to move elevator car 602 to different floors 616A-B |
| Elevator Controller 610 | Implements the control logic for elevator movement |
| Door Status Processor 612 | Provides the door status of both the floors 616A-B and car door 602 to elevator controller 610 |
| Request Processor 614 | Collects and forwards inputs such as destination floor requests from different floors and inside the car to elevator controller 610 |
| Floor 616A-B | Floors inside the elevator system |
| Floor Button 618A-B | Button on a floor for floor requests sent to request processor 614 |
| Floor Door 620A-B | Floor door |

In the example simulation model 600, car control 608, elevator controller 610, door status processor 612, and request processor 614 are example software components that receive, process, and transmit signals to and from other software or physical components in the elevator system. For example, door status processor 612 may receive a door status of elevator car 602 from car door 606, representative of a physical sensor that measures the car door position.

In some embodiments, model builder 112 builds the simulation model based on one or more inputs received from a user operating user device 106 or a data source storing information representing CPS 104. For example, model builder 112 may build the simulation model using a coupled DEVS model. Though the present disclosure generally describes a simulation model built as a coupled DEVS model, other types of methodologies to build the simulation model may be used such as Unified Modeling Language (UML) based, MATLAB or Modelica based, SysML (Systems Modeling Language) based, live hardware, or built using general-purpose programming languages such as C, C++, Java, FORTRAN, or Python. In some embodiments, the simulation model built by model builder 112 can be in a virtual environment, a live and virtual environment, or in a live, virtual, and constructive (LVC) environment.

In a virtual environment, the simulated components built by model builder 112 includes only virtual model components that communicate with each other using clearly defined application programming interfaces (APIs). Model builder 112 can build the simulated component using the same or different modeling methods, e.g., using a DEVS or a non-DEVS model. The simulated components can be implemented by model builder 112 on the same or different platforms (e.g., Windows or Linux) and written in the same or different programming languages (e.g., C++, Java, Python, etc.). Examples of non-DEVS models include models built using MATLAB, Modelica, and UML. DEVS models may encompass various types of models ranging from discrete to continuous models to hybrid systems. Therefore, a built simulation model may include a plurality of coupled components built using one or more models. For example, the built simulation model may include a component modeled as an atomic DEVS model, an example DEVS model, and a component modeled using UML, an example non-DEVS model.

In a live and virtual environment, one or more virtual components within the simulation model of the purely virtual environment may be replaced by live models of CPS 104. An example of a live model may be a physical component, e.g., a hardware system or device, from CPS 104. Another example of the live model may be a virtualized instance of control software in the physical component. For example, within simulation model 600 of an elevator system, motor 609 representing a motor in the elevator system may be replaced with a physical motor.

Modeling CPS 104 in a live and virtual environment increases the fidelity of the modeled CPS 104. For example, replacing one or more virtual components with corresponding live components of CPS 104 may modify the simulation model to take into account network propagation delays of the live components, which may not have existed when the simulated components were purely virtual components.

In the LVC environment, the simulation model may be built by model builder 112 based on user inputs to include virtual components, live components, constructive components, or a combination thereof to further improve the fidelity of the simulation model. The simulation model may be generated on various platforms (e.g., Windows or Linux) and written in various programming languages (e.g., C++, Java, Python, etc.). Further, the simulation model in the LVC environment may include DEVs models or non-DEVS models such as MATLAB, Modelica, or UML. In some embodiments, a constructive component models a human interacting with one or more virtual or live components in CPS 104. For example, in the elevator system of simulation model 600, model builder 112 may be further configured to include a passenger component to simulate the interactions of a passenger with the various components such as car button 604 and floor buttons 618A-B.

In some embodiments, model builder 112 receives, from user device 106, a selection of an attacked component set and an evaluated component set from the components within the CPS. The selected attacked component set may include one or more components within the simulation model that are to be cyber-attacked. For example, in simulation model 600, the selected attacked component set may be elevator controller 610, which runs software that may be vulnerable to cyber-attacks. The selected evaluated component set may include one or more components within the simulation model whose effect is to be evaluated as a result of the cyber-attacked attacked component set. For example, in simulation model 600, the selected evaluated component set may be car control 608 or elevator car 602 including multiple components. The components between the attacked component set and the evaluated component set do not overlap.

In some embodiments, a user directs control component inserter 114 to insert a control component into the simulation model built by model builder 112 to simulate a cyber-attack on the attacked component set without inducing malware contamination among other undesirable effects into the simulated model. As further described with respect to FIGS. 3 and 5, control component inserter 114 may be configured to reroute one or more connections to or from the attacked and evaluated component sets such that all direct or indirect communication between the attacked and evaluated component sets is intercepted by the control component, according to some embodiments.

In some embodiments, by configuring the control component to simulate cyber-attacks on the attacked component set, cyber-attack simulator 116 enables the effects of cyber-attacks on the attacked component set to be evaluated without altering the functionality or behavior of the attacked component set. Because any direct or indirect communication between the attacked and evaluated component set are intercepted by the control component, cyber-attack simulator 116 can be configured to control what or when an output is transmitted by the control component to simulate how the attacked component set would operate under cyber-attack. Further, by using the control component to simulate a cyber-attack on the attacked component set, cyber-attack simulator 116 can be configured to simulate how the evaluated component set would interact with the attacked component set were the attacked component set to be under cyber-attack. Further, cyber-attack simulator 116 may include a user interface enabling a user operating user device 106 to control the configuration of the control component. In some embodiments, as described below with respect to FIG. 3, the control component can be configured to manipulate transmitted communications to inject into the simulation model cyber effects of the following four types: a transformed input, a transitioned state, a new state with defined input, and a new state with undefined input.

Figure 2:
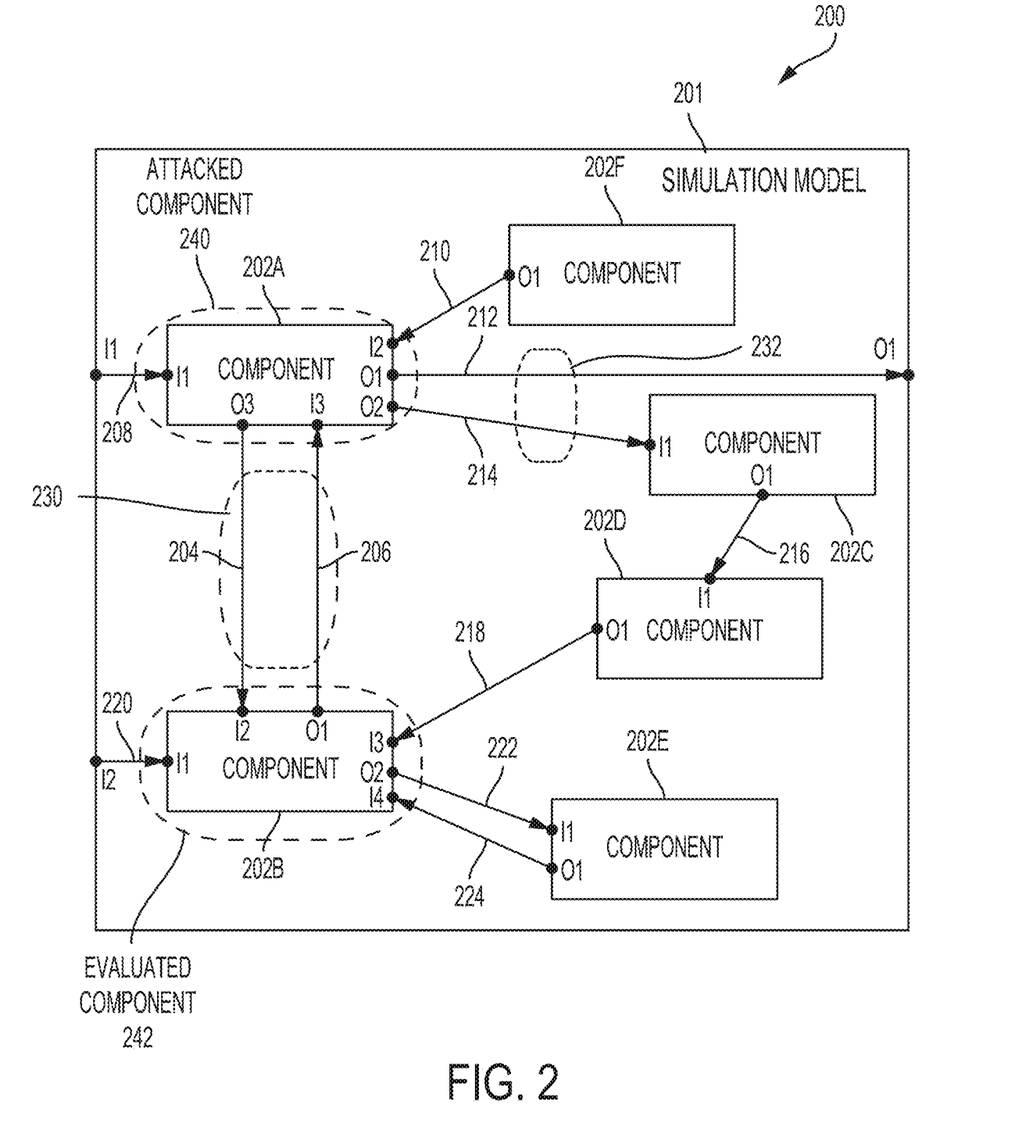
FIG. 2 illustrates a simulation model representing a CPS, according to some embodiments.

FIG. 2 is a diagram 200 illustrating a simulation model 201 that represents a cyber-physical system (CPS) such as CPS 104 from FIG. 1, according to some embodiments. Simulation model 201 may be built by simulation device 110, as described with respect to FIG. 1. In some embodiments, model builder 112 in simulation device 110 can build simulation model 201 using a coupled components model, e.g., a coupled DEVS model, where each of the simulated components 202A-F corresponds to a physical or software component in the CPS. For example, if the CPS is an automobile, a physical component may represent brakes of the automobile and a software component may represent a brake-control module within a processor in the automobile that controls the brakes. In another example, as described above with respect to FIG. 6, the CPS may be an elevator system whose corresponding simulation model 601 may include: physical components such as floor buttons 618A-B and car button 604; and software components such as car control 608 and elevator controller 610.

In some embodiments, each of components 202A-F can be built and modeled by model builder 112 using an atomic component (e.g., an atomic DEVS model) or a coupled component (e.g., a coupled DEVS model). An atomic component may represent a component whose system architecture or behavior cannot be decomposed any further or whose decomposition would provide no useful information for assessing effects of cyber-attacks. For example, in simulation model 600, car button 604 that simulates the functionality of a physical button in an elevator car may be modeled using an atomic DEVS model. In contrast, a coupled component can be built by model builder 112 as two or more interacting components where each interacting component can be represented as either an atomic component or a coupled component. As shown in diagram 200, components 202A-202F are each modeled as an atomic component. However, simulation model 201, which is built as a coupled DEVS model, may itself be a sub-component of a coupled component within a CPS. In the example of simulation model 600, elevator car 602 may be modeled as a coupled DEVS component that includes the following atomic DEVS components: car button 604, car door 606, motor 609, and car control 608.

In some embodiments, as shown in FIG. 2, an atomic component can be simulated using an atomic DEVS model. In some embodiments, an atomic DEVS model for modeling a component from the CPS can be represented by the following parameters: a set of input ports (X), a set of output ports (Y), a set of states (S) including a current state, a set of internal state transition functions ($\delta$int: S→S) for updating the current state over time, a set of external transition functions ($\delta$ext: Q×Xb→S where Q={(s,e)|s∈S,0≤e≤ta(s)} as the total state set, where e is the time elapsed since the last external transition, and Xb is the set of multisets (also referred to as bags or msets) over elements in X) to update the current state when an external event arrives to one of the input ports, a set of output functions (λ: S→Y) to generate one or more outputs to the output ports after internal transition functions are completed, and a time advancing function (ta(s): R+0,∞) to simulate operation of the component over time. Because the CPS can be a distributed system with concurrent events occurring in multiple components, model builder 112 may add an additional parameter: a set of confluent functions to each DEVS model in simulation model 201 to resolve collisions in simulations by resolving the order of simultaneous events in both atomic and coupled DEVS models. In some embodiments, model builder 112 builds simulation model 201 using parallel-DEVS (pDEVS) formulism where each of the atomic DEVS models within simulation model 201 has a confluent transition function (δcon: S×Xb→S subject to δcon(s,φ)=δint(s) that is executed if δext and δint end up in collision) to resolve potential collisions during simulation.

As shown in simulation model 201, each of the components 202A-F is pictorially represented by a set of ports. For example, component 202A, which corresponds to a physical or software component in the CPS, is modeled as having six ports: three input ports I1-3 for receiving inputs from outside simulation model 201, component 202F, and component 202B, respectively; and three output ports O1-3 for transmitting outputs to outside simulation model 201, component 202C, and component 202B, respectively. The various state transitions and functions associated with the atomic DEVS, as discussed above, are not depicted in diagram 200 for ease of illustration.

In some embodiments, as shown in FIG. 2, a coupled component can be simulated using a coupled DEVS model. In some embodiments, a coupled DEVS model is represented by the following parameters: a set of input ports (X), a set of output ports (Y), a set of components represented as DEVS models ($M_d$ with d∈D where D is a set of labels uniquely identifying each component being modeled), a set of influencer components for each component model $M_d$ ($I_d$ is the influencer set of d: $I_d \subseteq g$ D∪{DEVS$_{coupled}$}, d∉$I_d$, and for each i∈$I_d$), and a set of connections ($Z_{i,d}$ representing an i-to-d coupling). For example, as shown in diagram 200, simulation model 201, which is an example coupled DEVS model, may be represented as a set of inputs I1-2, a set of outputs O1, a set of components 202A-F, a set of influencer components for each simulated component 202A-F, and a set of connections 204-224. The set of connections 204-224 may, for example, include external-input connections 208 and 220, external-output connection 232, and internal connections 204, 206, 210-218, and 220-232.

In some embodiments, model builder 112 can include a user interface that prompts a user to enter the above parameters for each component of the CPS being simulated. Based on the user inputs, model builder 112 may build a simulation model of the CPS, such as simulation model 600 of an elevator system, as shown in FIG. 6.

In some embodiments, a set of influencer components for a simulated component represents components in the coupled DEVS model that transmits outputs to one or more input ports of that simulated component. For example, a set of influencer components for component 202C includes component 202A because component 202A transmits outputs to component 202C via connection 214. In the example simulation model 600 of an elevator system, as shown with respect to FIG. 6, request processor 614 may be built to simulate real elevator hardware that collects and forwards destination floor requests (from a floor button or from a car button inside the elevator car) to elevator controller 610 that implements the control logic for elevator movement. The set of influencer components for request processor 614 includes components whose outputs are received by request processor 614 and include car button 604 and floor buttons 618A-B.

In another example, a set of influencer components for component 202B includes components 202A, 202D, and 202E that transmit outputs to component 202B via connections 204, 218, and 224, respectively. In some embodiments, identifying the set of influencers for each of components 202A-F defines the system architecture of the simulation model 201 built as a coupled DEVS model. In the example simulation model 600 of an elevator system, modeling the connections between various simulated components defines the system architecture of the elevator system.

In some embodiments, upon building simulation model 201 to represent the CPS, model builder 112 can enable a user to select an attacked component set 240 on which a cyber-attack is to be simulated and to select an evaluated component set 242 on which the effects of the cyber-attack is to be evaluated. Attacked component set 240 and evaluated component set 242 are selected as non-overlapping portions of simulation model 201 where each of attacked component set 240 and evaluated component set 242 may include one or more of simulated components 202A-F. For example, attacked component set 240 selected by the user may include component 202A and evaluated component set 242 selected by the user may include component 202B.

For example, in the context of an elevator system as shown in simulation model 600 of FIG. 6, an attacked component set selected by the user may include just one of the components within elevator car 602 or all four components within elevator car 602. In this example, the user may be interested in evaluating how cyber-attacks on specific components in elevator car 602 would affect elevator controller 610. As described above, elevator controller 610 may be configured to control the control logic for elevator car 602 and operation of floor doors 620A-B. Accordingly, the evaluated component set selected by the user may include elevator controller 610. For example, a cyber-attack may cause car door 606 to transmit a car position of floor 5 instead of floor 2 (i.e., a wrong car position) to door status processor 612. As shown in FIG. 6, the output of door status processor 612 is transmitted to elevator controller 610. If floor 3 were the intended floor, receiving the wrong car position of floor 5 may cause elevator controller 610 to wrongly command elevator car 602 to move down towards floor 3. The various types of cyber-attack that may be simulated are further described below with respect to FIG. 3.

In some embodiments, to simulate a cyber-attack on attacked component set 240, simulation device 110 may identify: any direct connections 230 between attacked component set 240 and evaluated component set 242; and any indirect connections 232 associated with attacked component set 240 and evaluated component set 242. As described with respect to FIG. 3 below, these direct connections 230 and indirect connections 232 are rerouted through an inserted control component to enable evaluation of the CPS under cyber-attack.

Figure 3:
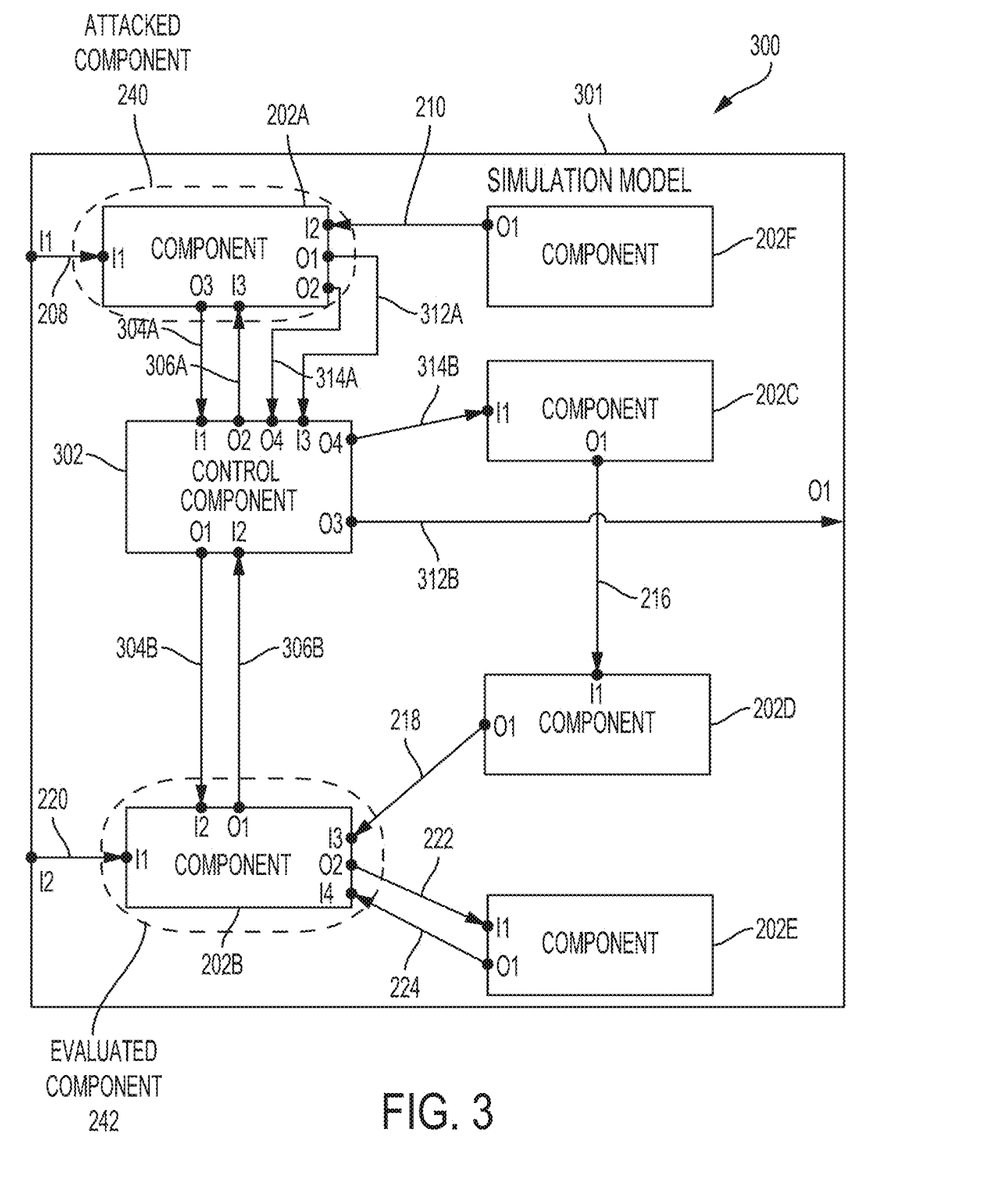
FIG. 3 illustrates a simulation model with a control component, according to some embodiments.

FIG. 3 is a diagram 300 illustrating a simulation model 301 with a control component 302, according to some embodiments. In some embodiments, simulation device 110 described with respect to FIG. 1 inserts control component 302 into simulation model 201 from FIG. 2 to build simulation model 301. In particular, control component inserter 114 may augment simulation model 201 with a user-configurable control component 302 to build simulation model 301 such that a user can simulate a cyber-attack on attacked component set 240 and observe cyber effects on evaluated component set 242 without adverse effects on components 202A-F in simulation model 201. In some embodiments, like simulation model 301, control component 302 can itself be modeled as a plurality of components (e.g., atomic or coupled components). For example, control component 302 may be modeled as a system of coupled components. The plurality of components may include a memory, a storage device, a processor, sub-components, or a combination thereof. Control component 302 may be modeled using an atomic DEVS model, a coupled DEVS model, other types of models such as Unified Modeling Language (UML) based, MATLAB or Modelica based, SysML (Systems Modeling Language) based, or built using general purpose programming languages such as C, C++, Java, FORTRAN, or Python.

In some embodiments, upon inserting control component 302 into simulation model 201, control component inserter 114 reroutes a subset of connections to or from attacked component set 240 and a subset of connections to or from evaluated component set 242 through control component 302. For example, to determine the subset of connections to reroute, control component inserter 114 may analyze connections 208-214 associated with attacked component set 240 and analyze connections 218-224 associated with evaluated component set 242.

In some embodiments, control component inserter 114 analyzes only connections with communications being transmitted from either attacked component set 240 or evaluated component set 242 to identify the subset of connections to be routed. For example, control component inserter 114 may analyze only connections 204, 212, and 214 (associated with communications originating from attacked component set 240) and connections 206 and 222 (associated with communications originating from evaluated component set 242) to determine which connections are to be routed. As described below, the analyses performed by control component inserter 114 includes determining direct and indirect connections.

In some embodiments, control component inserter 114 identifies the subset of connections from the analyzed connections based on whether an analyzed connection directly or indirectly connects attacked component set 240 and evaluated component set 242. If an analyzed connection does not directly or indirectly connect attacked component set 240 and evaluated component set 242, control component inserter 114 does not reroute the analyzed connection through control component 302.

In some embodiments, control component inserter 114 identifies connections 204 and 206 from simulation model 201 as being direct connections 230 (as shown in FIG. 2). Control component inserter 114 may then log the identified direct connections 230 and disconnect direct connections 230 from simulation model 201. In the example of simulation model 600, described above, the direct connections between elevator car 602 (e.g., an attacked component set) and elevator controller 610 (e.g., an evaluated component set) may include connections 622 and 624, each of which directly connects elevator car 602 and elevator controller 610.

In some embodiments, control component inserter 114 identifies indirect connections from simulation model 201 with disconnected direct connections 230. In other words, control inserter 114 may identify the indirect connections after disconnecting direct connections 230 from simulation model 201. For example, to identify the indirect connections, control component inserter 114 may analyze the remaining connections 214, 232, and 222 (i.e., remaining analyzed connections associated with communications originating from attacked component set 240 or evaluated component set 242).

Indirect connections 232 (as shown in FIG. 2) are connections that either: originate from attacked component set 240 that can transitively influence any component in evaluated component set 242; or originate from evaluated component set 242 that can transitively influence any component in attacked component set 240. For example, control component inserter 114 identifies connection 214 as an indirect connection 232 because connection 214 originates from component 202A (in attacked component set 240) and can indirectly influence evaluated component set 242 via connections 216 and 218. In contrast, control component inserter 114 does not identify connection 222 as an indirect connection 232 because outputs being transmitted from component 202B via connection 222 cannot transitively reach any component in attacked component set 240. In some embodiments, control component inserter 114 determines whether a connection is an indirect connection 232 by performing a recursive algorithm, such as a depth-first search algorithm, to determine whether the connection permits communication from attacked component set 240 to reach evaluated component set 242 or vice versa.

In the example of simulation model 600, described above, the indirect connections between elevator car 602 (e.g., an attacked component set) and elevator controller 610 (e.g., an evaluated component set) may include connections 626 and 628. Connection 626 shows that the output of car button 604 (e.g., indicating a desired floor) is transmitted to request processor 614 that processes floor requests from elevator car 602 and other floors. Though elevator controller 610 does not directly receive the output of car button 604, elevator controller 610 does receive the output of request processor 614; therefore, connection 626 is an indirect connection because the output of car button 604 is indirectly transmitted to elevator controller 610 via request processor 614.

In some embodiments, control component inserter 114 determines a connection to be an indirect connection 232 if the connection forwards an output from either attacked component set 240 or evaluated component set 242 to outside simulation model 201. This is because this type of connection, such as connection 212, may be a direct or indirect input to either attacked component set 240 (via connection 208) or evaluated component set 242 (via connection 220). In some embodiments, control component inserter 114 logs and disconnects each of the identified indirect connections 232 from simulation model 201. In some embodiments, control component inserter 114 iterates over the latest version of simulation model 201 with disconnected direct or indirect connection(s) to identify each successive indirect connection.

In some embodiments, upon disconnecting identified direct connections 230 and indirect connections 232 from simulation model 201, control component inserter 114 can add two new connections for each disconnected connection (including any direct connections 230 and any indirect connections 232) to reroute each disconnected connection through control component 302. In some embodiments, control component inserter 114 iterates through the logged direct connections 230 and indirect connections 232 to build simulation model 301.

For example, control component inserter 114 may add new connections 304A and 304B to reroute connection 204 through control component 302. Connection 304A connects component 202A to control component 302 and connection 304B connects control component 302 to component 202B. Similarly, control component inserter 114 may add new connections 306A and 306B to reroute connection 206 through control component 302. Indirect connections 232 are similarly rerouted where connection 212 is replaced by two new connections 312A and 312B in simulation model 301 and connection 214 is replaced by two new connections 314A and 314B, as shown in FIG. 3.

In some embodiments, cyber-attack simulator 116 can configure control component 302 to simulate the impact that a cyber-attack on attacked component set 240 can have on the rest of simulation model 301 and in particular, evaluated component set 242. In general, the simulated effects may be classified as normal effects or abnormal effects. A system, such as each of components 202A-F or simulation model 201, is associated with a set of potential states, each potential state representing a unique set of state variables. However, the system is often designed to operate in only a subset of these potential states. Therefore, a cyber-attack on attacked component set 240 can place simulation model 201 (including evaluated component set 242) into any of the potential states, some of which may not be present under normal operation. Therefore, a normal effect represents placing simulation model 201 (including evaluated component set 242) in a state that can be reached under normal operation whereas an abnormal effect represents placing simulation model 201 in a state that would not occur under normal, correct operation. For example, in the example simulation model 600 of an elevator system, elevator car 602 may be associated with a plurality of states. A normal effect may include causing elevator car 602 to reach the wrong floor (e.g., floor 5) with closed doors that open after a predetermined period of time elapses while elevator car 602 remains at that wrong floor. Elevator car 602 arriving at a floor with closed doors that subsequently open after a delayg is a state that can be reached under normal elevator operation. In contrast, an abnormal effect may cause elevator car 602 to open its doors while between two floors (e.g., between floors 5 and 6). Opening doors between floors is a state that cannot be reached under normal elevator operation.

In some embodiments, cyber-attack simulator 116 configures control component 302 to include one or more new internal couplings, one or more corresponding transformation functions, or a combination thereof between control component 302 and a component being connected via the rerouted direct connections 230 or indirect connections 232. In some embodiments, cyber-attack simulator 116 can configure control component 302 to build a specific output via one of the rerouted connections (e.g., one of connections 304B, 306A, 314B, and 312B) to simulate cyber-attacks. In some embodiments, control component 302 can control an output to simulate a cyber-attack on attacked component set 240. In some embodiments, controlling an output includes modifying a content of the output, preventing a delivery of the output, changing an order of delivery of a plurality of outputs, delaying a delivery of the output, or originating a new output. Control component 302 can be configured to simulate a cyber-attack to cause one of the following four effects: transformed input, transitioned state, new state with defined input, and new state with undefined input. In some embodiments, control component 302 can be configured to simulate the cyber-attack to cause two or more of the above four effects.

In some embodiments, the transformed input may refer to changing the range of the input values being rerouted through control component 302, or delaying the input with or without transforming it first. For example, control component 302 may output a different value via connection 304B than that received via connection 304A. In the example simulation model 600 of an elevator system, the transformed input effect may include modifying the car position transmitted from car control 608 to elevator controller 610. For example, a control component that intercepts connection 624 may receive a current car position of floor 3 from car control 608. Instead of forwarding the car position of floor 3, the control component may instead transmit a car position of floor 5 to elevator controller 610.

In some embodiments, the transitioned state effect may refer to outputting a specific value that puts the system (e.g., a coupled component or an atomic component) receiving the specific value into another state and triggers the associated transitions to that state where the specific value may be an existing value that the receiving system is configured to process. For example, control component 302 may alter a message received from attacked component set 240 via 314A and intended for component 202C such that the outputted message (via connection 314B) forces component 202C to transition to another state.

In the example simulation model 600 of an elevator system, the transitioned state effect may include forcing elevator car 602 to move to another floor with its doors open. For example, elevator car 602 may be at floor 616A (i.e., floor 1) and under normal operation, car control 622 may receive and execute a command from elevator controller 610 to close the elevator doors before controlling motor 609 to move elevator car 602 to floor 616B (i.e., floor 2). A control component can be inserted between car door 606 and door status processor 612 to simulate a cyber-attack on car door 606 where a car door status of "open" from car door 606 may be replaced with a card door status of "closed." In this case, door status processor 612 may mistakenly notify elevator controller 610 that the elevator car doors are closed. Accordingly, elevator controller 610 does not transmit a command to car control 608 to close the doors before commanding elevator car 602 to move to floor 616B; therefore, elevator car 602 transitions into a movement state even though its doors may be open.

In some embodiments, the new state with defined input effect may refer to outputting a specific value that causes the system (e.g., a coupled component or an atomic component) receiving the specific value to enter a new state that does not exist under normal operation with associated new transitions. Though the specific value may be a value that the receiving system is configured to process, control component 302 may be configured to inject that specific value at an abnormal time that would not occur under normal, un-hacked operation.

In the example simulation model 600 of an elevator system, the new state with defined input may include causing elevator car 602 to open its doors in between floors in response to a defined input. For example, elevator car 602 may be commanded to move upwards from floor 616A (i.e., floor 1) to floor 618B (i.e., floor 2). A control component may be configured to simulate a cyber-attack on car door 606 by transmitting an output to door status processor 612 indicating that floor 618B is reached even if elevator car 602 is in between floors 618A and 618B. The door status processor 612 may forward the output of reaching floor 618B to elevator controller 610, which then commands elevator car 602 to open its doors.

In some embodiments, the new state with undefined input effect may refer to outputting a specific value that is outside the input range of the receiving system (e.g., a coupled component or an atomic component) to cause the system to enter a new state that does not exist under normal operation with associated new transitions. Therefore, by simulating a cyber-attack to inject an input that is outside the programming of a receiving system can cause the receiving system to malfunction.

In the example simulation model 600 of an elevator system, the new state with undefined input may include simulating a cyber-attack on car door 606 to output a non-existent floor position, e.g., floor 12. For example, elevator car 602 may be commanded to move upwards from floor 616A (i.e., floor 1) to floor 618B (i.e., floor 2). Upon receiving the undefined input of floor position of 12, elevator controller 610 may respond by commanding elevator car 602 to move down even though elevator car 602 may already be on the ground floor 616A. In this example, elevator car 602 may remain on floor 616A.

In some embodiments, cyber-attack simulator 116 configures control component 302 to receive a control command to activate or de-active specific cyber effects. For example, the use of control commands may simulate a cyber-attack, e.g., malware, that starts operating when certain conditions are triggered.

In summary, by inserting control component 302 in simulation model 301 and rerouting every identified direct and indirect connection through control component 302, cyber-attacks can be simulated on attacked component set 240 by controlling what or how information is being transmitted from attacked component set 240 to other components in the simulation model. Therefore, a cyber-attack on attacked component set 240 can be modeled without directly altering the functionality or behavior of attacked component set 240. Then, effects of the user-configured control component 302 (representative of a cyber-attack on attacked component set 240) on evaluated component set 242 can be evaluated without irreparably damaging the corresponding component in the CPS.

Figure 4:
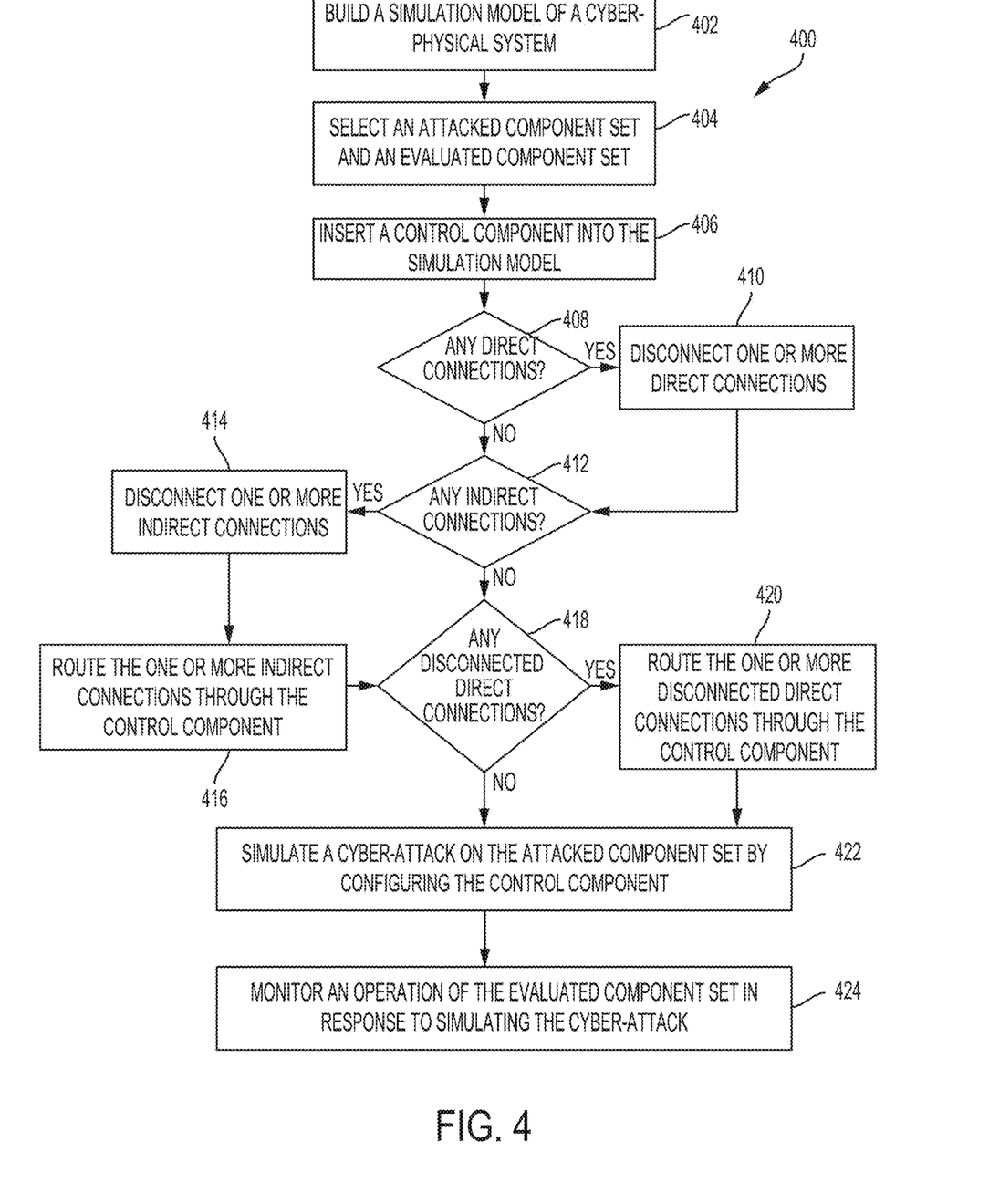
FIG. 4 illustrates a method for enabling evaluation of cyber effects in a CPS, according to some embodiments.

FIG. 4 is a flowchart illustrating a method 400 for enabling evaluation of cyber effects in a CPS, according to some embodiments. Method 400 may be, for example, implemented by a simulation device such as simulation device 110 described with respect to FIG. 1. For ease of explanation, steps of method 400 may reference simulation models 201 and 301 from FIGS. 2 and 3, respectively.

In step 402, a model builder such as model builder 112 builds a simulation model of a CPS. In some embodiments, the simulation model is built as a plurality of coupled components. In some embodiments, the simulation model can be built using a coupled DEVS model to simulate the plurality of coupled components. For example, as illustrated in simulation model 201, the CPS may be simulated as a plurality of components 202A-F and connections 204-224 that show a flow of inputs and outputs to model the system architecture and behavior of the CPS.

In step 404, the model builder selects an attacked component set and an evaluated component set from the simulated components. In some embodiments, the attacked component set and the evaluated component set can each represent a non-overlapping portion of the simulation model. For example, as shown in simulation model 201, attacked component set 240 includes one component (component 202A) and evaluated component set 242 includes one component (component 202B) that does not overlap the portion of simulation model 201 selected as attacked component set 240. In some embodiments, the model builder receives a selection of the attacked component set and the evaluated component set based on input from a user, for example, from user device 106 of FIG. 1.

In step 406, a control component inserter such as control component inserter 114 inserts a control component into the simulation model. For example, the control component inserter may insert control component 302 into simulation model 301 in FIG. 3.

In step 408, the control component inserter identifies whether one or more direct connections exists in the simulation model that directly connects the attacked component set to the evaluated component set. For example, connections 204 and 206 from simulation model 201 are identified as direct connections 230 because connections 204 and 206 directly connect attacked component set 240 and evaluated component 242, respectively. If one or more direct connections are identified, method 400 proceeds to step 410. Otherwise, method 400 proceeds to step 412.

In step 410, the control component inserter disconnects the one or more direct connections identified in step 408 from the simulation model. In some embodiments, the one or more direct connections are logged by the control component inserter to enable subsequent rerouting of the one or more direct connections. The one or more direct connections may be logged before or after step 410.

In step 412, the control component inserter identifies whether one or more indirect connections exists in the simulation model that transitively connect the attacked component set to the evaluated component set in the simulation model with no connected direct connections. If method 400 proceeded to step 412 from step 408, then the simulation model built in step 402 did not have any direct connections. If method 400 proceeded to step 412 from step 410, then the one or more identified direct connections of step 408 were removed from the simulation model. In some embodiments, any indirect connections can be identified from the simulation model only after every direct connection that has been identified in step 408 is disconnected from the simulation model in step 410.

In some embodiments, the one or more indirect connections connect the attacked component set or the evaluated component set to an intermediary component in the simulation model or the disconnected simulation model. For example, with respect to FIG. 2, connection 214, which couples attacked component set 240 to intermediary component 202C, is identified as an indirect connection 232 because outputs from attacked component set 240 can be transitively transmitted to evaluated component set 242 via connections 216 and 218. Therefore, connection 214 transitively connects attacked component set 240 to evaluated component set 242 with direct connections 230 being disconnected. If one or more indirect connections are identified, method 400 proceeds to step 414. Otherwise, method 400 proceeds to step 418.

In step 414, the control component inserter disconnects the one or more indirect connections identified in step 412 from the simulation model. In some embodiments, the one or more indirect connections are logged by the control component inserter to enable subsequent rerouting of the one or more indirect connections. The one or more indirect connections may be logged before or after step 414.

In step 416, the control component inserter routes the one or more indirect connections identified in step 412 through the control component inserted in step 406. For each identified indirect connection between an intermediary component and the attacked component set or the evaluated component set, control component inserter adds two new connections connecting the control component to the intermediary component and the attacked component set or the evaluated component set. For example, connection 214 from FIG. 2 is an indirect connection 232 that is replaced with new connections 314A and 314B in FIG. 3. If control component 302 is configured to pass through the information from component 202A to component 202C without any modification via connections 314A and 314B, then the functionality and behavior of connection 214 from FIG. 2 is preserved. Therefore, configuring the control component to alter how information received from component 202A via connection 314A is to be transmitted to component 202C (via connection 314B) simulates how attacked component set 240 would operate under cyber-attack without directly altering any functionality of attacked component set 240.

In step 418, the control component inserter determines whether any direct connections were disconnected from the simulation model. If one or more direct connections were disconnected, for example, in step 410, then method 400 proceeds to step 420. In some embodiments, any direct connection that was identified in step 408 can be logged as a set of direct connections. In these embodiments, the control component inserter determines whether one or more direct connections are logged. If no direct connections were disconnected, method 400 proceeds to step 422.

In step 420, the control component inserter routes the one or more direct connections (as identified in step 408) between the attacked component set and the evaluated component set through the control component. For each identified direct connection, the control component inserter adds two new connections connecting the control component to the attacked component set and the evaluated component set, respectively. For example, connection 206 from FIG. 2 is a direct connection 230 that is disconnected in simulation model 301 and replaced with two new connections 306A and 306B. Whereas connection 206 passes information from output port 1 of component 202B to input port 3 of component 202A, connection 306B passes information from the same output port 1 of component 202B to input port 2 of control component 302 and connection 306A passes information from output port 2 of control component 302 to input port 3 of component 202A.

In step 422, a cyber-attack simulator such as cyber-attack simulator 116 simulates a cyber-attack on the attacked component set by configuring the control component to control an output sent by the control component via a routed connection. The routed connection is one of the one or more direct connections routed in step 420 or one of the one or more indirect connections routed in step 416. In some embodiments, the cyber-attack simulator (e.g., cyber-attack simulator 116) configures the control component to set a value of the output, control whether to transmit the output, when to transmit the output, or a combination thereof. In some embodiments, as described above with respect to FIG. 3, setting the value of the output can include: modifying a content of the output by modifying an input that the control component receives from the attacked component set or the evaluated component set, or originating a new output independent from any input that the control component receives from the attacked component set or the evaluated component set. In some embodiments, as described above with respect to FIG. 3, controlling when to transmit the output can include setting the time at which to transmit the output to delay a delivery of the output or to change an order of delivery of multiple outputs.

In some embodiments, the cyber-attack simulator configures the control component to transmit the output to inject, into the simulation model, one of the following four effects: a transformed input, a transitioned state, a new state with defined input, or a new state with undefined input. In some embodiments, cyber-attack simulator configures the control component to transmit the output to inject two or more of the above four effects. Each of the four effects is further described above with respect to FIG. 3.

In step 424, the cyber-attack simulator monitors an operation of the evaluated component set in response to simulating the cyber-attack on the attacked components. In some embodiments, monitoring the operation of the evaluated component set enables the impact of the simulated cyber-attack on the attacked component set to be evaluated. In some embodiments, the cyber-attack simulator monitors the operation of the evaluated component set by logging a state, a state change, an output, or a combination thereof of each component in the evaluated component set across a period of evaluation time after the simulated cyber-attack.

In some embodiments, in addition to logging the disconnected direct and indirect connections in steps 410 and 414, the control component inserter can be configured to log each of the new connections added to the simulation model (as described with respect to steps 416 and 420) to replace the disconnected connections. In some embodiments, the control component inserter can be configured to apply the log of connections and disconnections to the CPS being simulated by the simulation model to enable fast reconfiguration of the CPS for testing. Therefore, like the simulation model of the CPS, the connections in the CPS can be rerouted to include the control component configured to simulate cyber-attacks. Once the CPS has been rerouted to include the control component, the simulation device may be configured to conduct tests on the CPS by simulating a cyber-attack on the CPS via the control component, as described with respect to step 422. The log of connections and disconnections, however, are not limited to reconfiguration of the CPS. In some embodiments, the log can be applied to various simulation environments used to simulate the CPS such as in a virtual environment, a live and virtual environment, or in a live, virtual, and constructive (LVC) environment, as described above with respect to FIG. 1.

Figure 5:
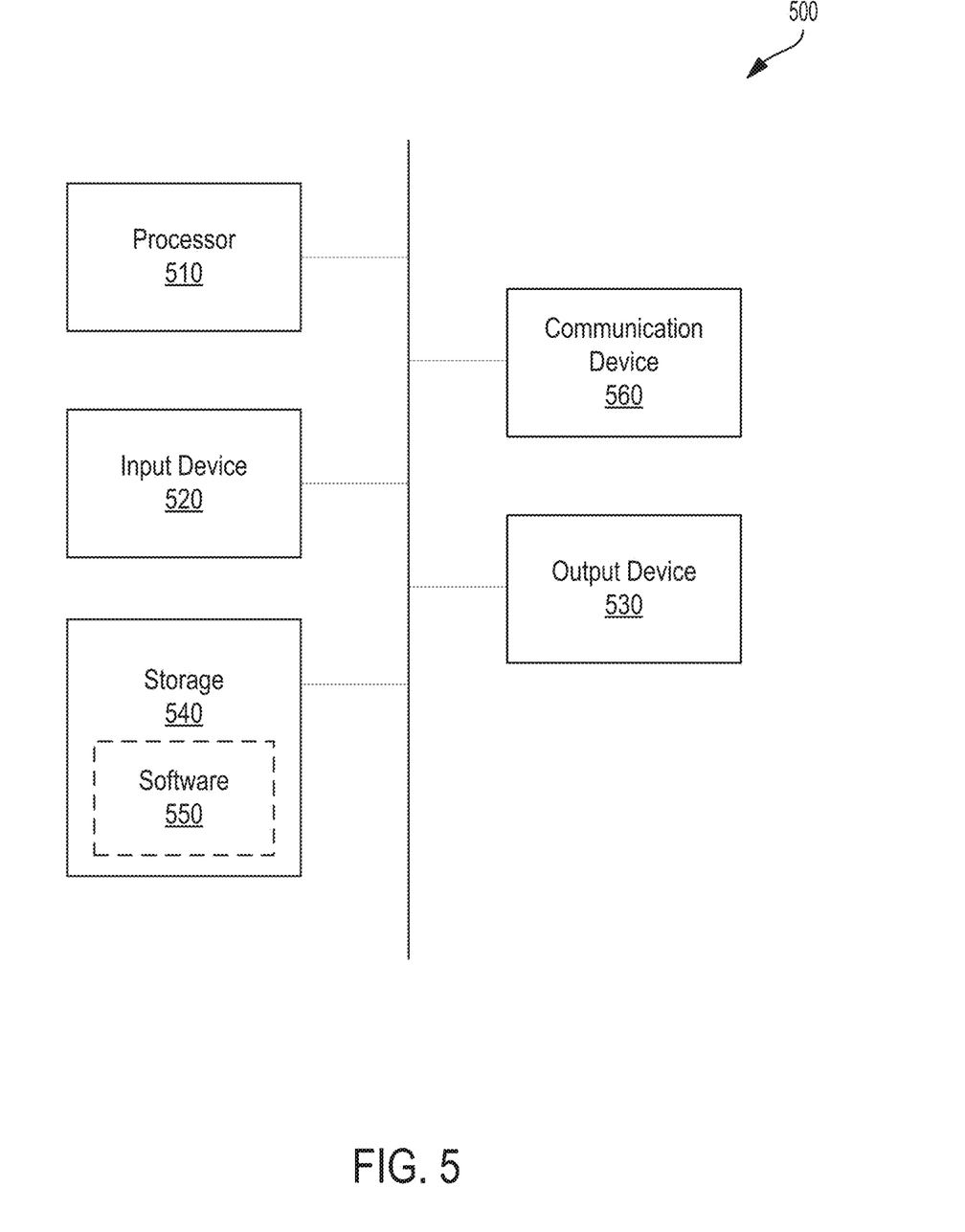
FIG. 5 illustrates an example of a computing device in accordance with one embodiment.

FIG. 5 illustrates an example of a computing device 500 in accordance with one embodiment. Device 500 can be a host computer connected to a network. Device 500 can be a client computer or a server. As shown in FIG. 5, computing device 500 can be any suitable type of microprocessor-based device, including a personal computer, work station, server, or handheld computing device (portable electronic device), such as a phone or tablet. Device 500 can include, for example, one or more of processor 510, input device 520, output device 530, storage 540, and communication device 560. Input device 520 and output device 530 can generally correspond to those described above and can either be connectable or integrated with device 500.

Input device 520 can be any suitable device that provides input, such as a touch screen, keyboard or keypad, mouse, or voice-recognition device. Output device 530 can be any suitable device that provides output, such as a touch screen, haptics device, or speaker.

Storage 540 can be any suitable device that provides storage, such as an electrical, magnetic, or optical memory including a RAM, cache, hard drive, or removable storage disk. Communication device 560 can include any suitable device capable of transmitting and receiving signals over a network, such as a network interface chip or device. The components of device 500 can be connected in any suitable manner, such as via a physical bus or wirelessly.

Software 550, which can be stored in storage 540 and executed by processor 510, can include, for example, the programming that embodies the functionality of the present disclosure (e.g., as embodied in the devices as described above).

Software 550 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 540, that can contain or store programming for use by or in connection with an instruction execution system, apparatus, or device.

Software 550 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport readable medium can include, but is not limited to, an electronic, magnetic, optical, electromagnetic, or infrared wired or wireless propagation medium.

Device 500 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 500 can implement any operating system suitable for operating on the network. Software 550 can be written in any suitable programming language, such as C, C++, Java, or Python. In various embodiments, application software embodying the functionality of the present disclosure can be deployed in different configurations, such as in a client/server arrangement or through a web browser as a web-based application or web service, for example.

The foregoing description, for purpose of explanation, has been described with reference to specific embodiments. The illustrative discussions above, however, are not intended to be exhaustive or to limit the disclosure to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

What is claimed is:

1. A system for evaluating cyber effects in a cyber-physical system, the system comprising a device comprising one or more processors, memory, and one or more programs stored in the memory and configured to be executed by the one or more processors, the one or more programs including instructions for:
   building a simulation model of the cyber-physical system, the simulation model comprising an attacked component set and an evaluated component set;
   inserting a control component into the simulation model, the control component used to simulate a cyber-attack on the attacked component set;
   routing one or more connections between the attacked component and the evaluated component through the control component; and
   simulating the cyber-attack on the attacked component set by configuring the control component to control an output intercepted via the one or more routed connections from the attacked component set and to send the controlled output sent by the control component via the one or more routed connections to the evaluated component set, wherein the controlled output simulates the attacked component set under cyber-attack.

2. The system of claim 1, wherein the attacked component set comprises one or more simulated components in the simulation model and the evaluated component set comprises one or more simulated components in the simulation model different from the one or more simulated components in the attacked component set.

3. The system of claim 1, wherein the control component comprises a plurality of sub-components.

4. The system of claim 1, wherein controlling the output comprises setting a value of the output, controlling whether to transmit the output, controlling when to transmit the output, or a combination thereof.

5. The system of claim 1, wherein controlling the output comprises setting a value of the output by modifying a content of the output or originating a new output by the control component.

6. The system of claim 1, wherein controlling the output comprises controlling when to transmit the output by setting a time to transmit the output, delaying a delivery of the output, or changing an order of delivery of outputs.

7. The system of claim 1, wherein the simulation model is built as a coupled Discrete Event Systems (DEVS) model, and wherein each component in the coupled DEVS model is simulated as an atomic DEVS model or a coupled DEVS model.

8. The system of claim 1, wherein the simulation model comprises a plurality of coupled components, wherein each of the coupled components is modeled using live hardware, a modeling language, atomic or coupled DEVS models, or a general-purpose programming language.

9. The system of claim 8, wherein the modeling language comprises MATLAB, Unified Modeling Language (UML), SysML (Systems Modeling Language), Simulink, or AADL (Architecture Analysis and Design Language.

10. The system of claim 1, wherein routing one or more direct connections between the attacked component and the evaluated component comprises:
   for at least one of the one or more direct connections that forwards outputs from the attacked component set to the evaluated component set:

adding a first new connection forwarding messages from the attacked component set to the control component; and adding a second new connection forwarding messages from the control component to the evaluated component set.

11. The system of claim 1, wherein routing one or more indirect connections between the attacked component and the evaluated component comprises:

for at least one of the one or more indirect connections forwarding messages from the attacked component set or the evaluated component set to the intermediary component:

adding a first new connection forwarding messages from the attacked component set or the evaluated component set to the control component; and adding a second new connection forwarding messages from the control component to the intermediary component.

12. The system of claim 1, wherein the simulation model comprises a plurality of simulated components to simulate the cyber-physical system, and wherein determining one or more indirect connections between the attacked component and the evaluated component comprises:

identifying a component from the plurality of simulated components that transitively connects the attacked component set to the evaluated component set;

identifying that the component is directly connected to the evaluated component set or the attacked component set; and identifying the component as the intermediary component in response to both the identification of the component transitively connecting the attacked component set to the evaluated component set and the identification of the component being directly connected to the evaluated component set or the attacked component set.

13. The system of claim 1, wherein the simulation model comprises a plurality of simulated components to simulate the cyber-physical system, and wherein simulating the cyber-attack comprises:

replacing one or more simulated components of the plurality of simulated components with one or more corresponding components from the cyber-physical system.

14. The system of claim 1, wherein the one or more programs include instructions for:

generating a log comprising one or more new connections added to the simulation model to route the one or more connections between the attacked component and the evaluated component through the control component; and rerouting the cyber-physical system based on the log to enable the cyber-physical system to be tested against simulated cyber-attacks.

15. A method for evaluating cyber effects in a cyber-physical system, comprising:

building a simulation model of the cyber-physical system, the simulation model comprising an attacked component set and an evaluated component set;

inserting a control component into the simulation model, the control component used to simulate a cyber-attack on the attacked component set;

routing one or more connections between the attacked component set and the evaluated component set through the control component; and simulating the cyber-attack on the attacked component set by configuring the control component to control an output intercepted via the one or more routed connections from the attacked component set and to send the controlled output sent by the control component via the one or more routed connections to the evaluated component set, wherein the controlled output simulates the attacked component set under cyber-attack.

16. The method of claim 15, wherein the attacked component set comprises one or more simulated components in the simulation model and the evaluated component set comprises one or more simulated components in the simulation model different from the one or more simulated components in the attacked component set.

17. The method of claim 15, wherein the control component comprises a plurality of sub-components.

18. The method of claim 15, wherein controlling the output comprises setting a value of the output, controlling whether to transmit the output, controlling when to transmit the output, or a combination thereof.

19. The method of claim 15, wherein controlling the output comprises setting a value of the output by comprises modifying a content of the output or originating a new output by the control component.

20. The method of claim 15, wherein controlling the output comprises controlling when to transmit the output by setting a time to transmit the output, delaying a delivery of the output, or changing an order of delivery of outputs.

21. The method of claim 15, wherein the simulation model is built as a coupled Discrete Event Systems (DEVS) model, and wherein each component in the coupled DEVS model is simulated as an atomic DEVS model or a coupled DEVS model.

22. The method of claim 15, wherein the simulation model comprises a plurality of coupled components, wherein each of the coupled components is modeled using live hardware, a modeling language, atomic or coupled DEVS models, or a general-purpose programming language.

23. The method of claim 22, wherein the modeling language comprises MATLAB, Unified Modeling Language (UML), SysML (Systems Modeling Language), Simulink, or AADL (Architecture Analysis and Design Language.

24. The method of claim 15, wherein routing one or more direct connections between the attacked component and the evaluated component comprises:

for at least one of the one or more direct connections that forwards outputs from the attacked component set to the evaluated component set:

adding a first new connection forwarding messages from the attacked component set to the control component; and adding a second new connection forwarding messages from the control component to the evaluated component set.

25. The method of claim 15, wherein routing one or more indirect connections between the attacked component and the evaluated component comprises:

for at least one of the one or more indirect connections forwarding messages from the attacked component set or the evaluated component set to the intermediary component:

adding a first new connection forwarding messages from the attacked component set or the evaluated component set to the control component; and adding a second new connection forwarding messages from the control component to the intermediary component.

26. The method of claim 15, wherein the simulation model comprises a plurality of simulated components to simulate the cyber-physical system, and wherein determining one or more indirect connections between the attacked component and the evaluated component comprises:

identifying a component from the plurality of simulated components that transitively connects the attacked component set to the evaluated component set;

identifying that the component is directly connected to the evaluated component set or the attacked component set; and identifying the component as the intermediary component in response to both the identification of the component transitively connecting the attacked component set to the evaluated component set and the identification of the component being directly connected to the evaluated component set or the attacked component set.

27. The method of claim 15, wherein the simulation model comprises a plurality of simulated components to simulate the cyber-physical system, and wherein simulating the cyber-attack comprises:

replacing one or more simulated components of the plurality of simulated components with one or more corresponding components from the cyber-physical system.

28. The method of claim 15, wherein the one or more programs include instructions for:

generating a log comprising one or more new connections added to the simulation model to route the one or more connections between the attacked component and the evaluated component through the control component; and rerouting the cyber-physical system based on the log to enable the cyber-physical system to be tested against simulated cyber-attacks.

29. A non-transitory computer-readable storage medium comprising one or more programs for evaluating cyber effects in a cyber-physical system, wherein the one or more programs, when executed by one or more processors, cause the one or more processors to:

build a simulation model of the cyber-physical system, the simulation model comprising an attacked component set and an evaluated component set;

insert a control component into the simulation model, the control component used to simulate a cyber-attack on the attacked component set;

route one or more connections between the attacked component set and the evaluated component set through the control component; and simulate the cyber-attack on the attacked component set by configuring the control component to control an output intercepted via the one or more routed connections from the attacked component set and to send the controlled output sent by the control component via the one or more routed connections to the evaluated component set, wherein the controlled output simulates the attacked component set under cyber-attack.

* * * * *